US006708717B1

(12) United States Patent
Coogle

(10) Patent No.: US 6,708,717 B1
(45) Date of Patent: Mar. 23, 2004

(54) FLUSHING SYSTEM FOR AIR CONDITIONING DRAINAGE PIPES

(75) Inventor: Gregory Coogle, Pembroke Pines, FL (US)

(73) Assignee: Coogle Technology, L.L.C., Pembroke Pines, FL (US)

( * ) Notice: Subject to any disclaimer, the term of this patent is extended or adjusted under 35 U.S.C. 154(b) by 0 days.

(21) Appl. No.: 10/144,113

(22) Filed: May 10, 2002

(51) Int. Cl.[7] .......................... B08B 9/032; F28G 9/00; F16K 51/00; B67D 5/54

(52) U.S. Cl. ........................ 137/240; 62/303; 134/99.1; 134/166 C; 134/171; 137/112; 137/209; 285/354; 285/369

(58) Field of Search ................................ 137/209, 240, 137/112; 62/285, 286, 303; 134/94.1, 99.1, 102.2, 166 C, 171; 285/133.11, 133.21, 133.4, 351, 354, 355, 369

(56) References Cited

U.S. PATENT DOCUMENTS 2,044,921 A * 6/1936 Swanland ................... 137/112
3,276,929 A * 10/1966 Ferch ......................... 285/369
3,550,612 A * 12/1970 Maxon ....................... 137/112
3,845,779 A * 11/1974 Greene, Jr. ................. 137/209
4,070,044 A * 1/1978 Carrow ....................... 285/369
4,246,926 A * 1/1981 Morello ...................... 137/209
4,435,005 A * 3/1984 Berger et al. ............... 285/354
4,915,133 A * 4/1990 Harrison ................ 137/625.47
4,998,412 A * 3/1991 Bell ............................ 62/303
5,085,244 A * 2/1992 Funk .......................... 137/240
5,390,691 A * 2/1995 Sproule ......................... 137/1
5,722,458 A * 3/1998 Potter ......................... 137/240
5,964,238 A * 10/1999 Junkin ........................ 137/240
6,041,611 A * 3/2000 Palmer ....................... 137/240
6,068,023 A * 5/2000 Potter ......................... 137/240
6,584,995 B2 * 7/2003 Kimbrough et al. ........ 137/240
2003/0010381 A1 * 1/2003 Kimbrough et al. ........ 137/240

* cited by examiner

*Primary Examiner*—George L. Walton
(74) *Attorney, Agent, or Firm*—Yi Li

(57) ABSTRACT

A flushing system for air conditioning drainage pipes including a pipe assembly, a valve for selectively blocking the pass of the upstream drain line and a connection for a pressurized fluid supply. Each of the pipe assembly ends has a slidable tubular member cooperatively larger in diameter than said pipe assembly and drain line to snugly receive the ends of the pipe assembly. The tubular members are slid partially over the drain line ends and the ends of the pipe assembly. An alternate embodiment uses cooperating threads on the ends of the pipe assembly and one of the ends of the slidable tubular members. To flush the system with a fluid (liquid or gas), a user closes the valve assembly by rotating the ball valve member and applies the pressurized fluid to flush the system. Also, O-rings are used to enhance the sealing engagement in yet another embodiment.

10 Claims, 3 Drawing Sheets

FLUSHING SYSTEM FOR AIR CONDITIONING DRAINAGE PIPES

BACKGROUND OF THE INVENTION

1. Field of the Invention

The present invention relates to a flushing system, and more particularly, to a flushing system for air conditioning drainage pipes.

2. Description of the Related Art

Many designs for flushing systems for air conditioning installations have been developed in the past. The condensation of water in air conditioning equipments requires the constant collection of water. Sometimes, the water stands still encouraging the growth of algae, bacteria and other organisms that clog the pipes. None of these systems, however, includes sliding pipe members to facilitate the installation of the system to existing air conditioning drainage pipes. Nor do they disclose the use of standard water hose connectors or valve connectors for pressurized air. This permits the installation of the system with minimum effort.

Applicant believes that the closest reference corresponds to U.S. Pat. No. 6,182,677 issued to James Pignataro on Feb. 6, 2001 for cleanout fitting for air conditioner evaporator drains. The Pignataro's patented invention comprises an asymmetric T-pipe configuration, with a shutoff valve in one side of the crossmember of the T and a removable cap in the opposite end of the crossmember. However, it differs from the present invention because Pignataro's patented invention requires a difficult installation involving cutting and adapting the drainage pipes to place the T-shape fitting. Additionally, the clean out operation is not directed to the drain line but rather to the air handler tray. Also, there is no connection shown for a hose for delivering pressurized water. The present invention includes a swivel connector for readily connecting to a standard garden hose.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a flushing system that can be readily installed to air conditioning drainage pipes.

Another object of the invention is to provide a flushing system that is flexible in terms of its placement on any convenient location along the drainage pipe.

It is another object of this invention to provide a flushing system with selective alternatives to flush the air conditioning drainage pipes using different fluids, including water and/or gases.

It is still another object of the present invention to provide a flushing system with sliding pipe members to facilitate the installation.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
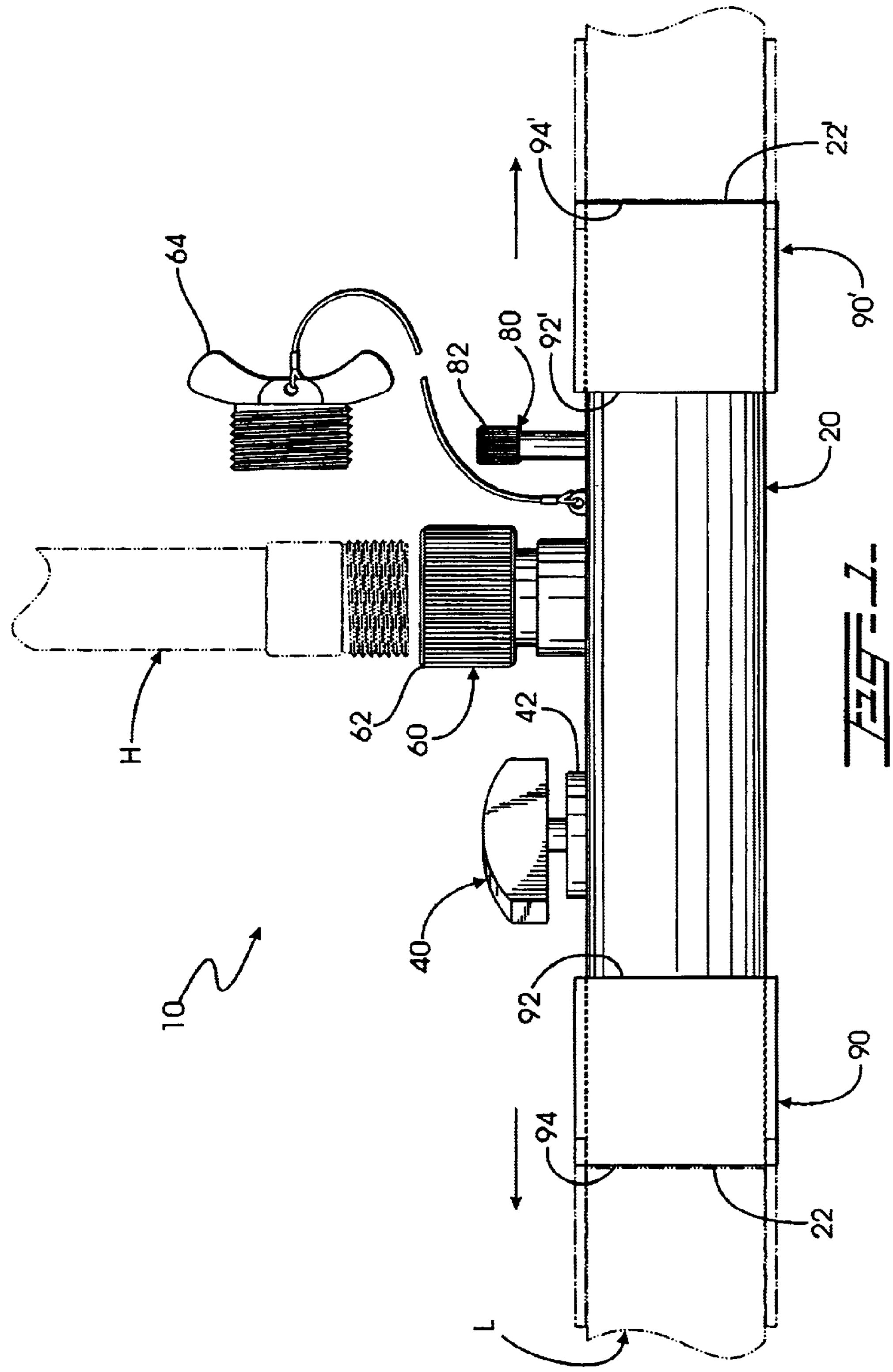
FIG. 1 represents a front elevational view of the preferred embodiment for the present invention, including a water hose connector and an air valve connector. The pipe of the air conditioning equipment is represented in phantom.

Referring now to the drawings, where the present invention is generally referred to with numeral 10, it can be observed that it basically includes pipe assembly 20, valve assembly 40, water hose connector 60, air valve connector 80, slidable tubular members 90 and 90', and air conditioner drain lines L (shown in phantom).

Pipe assembly 20 has a tubular shape and includes ends 22 and 22'. Pipe assembly 20 is connected in series at a section of drain line L. The diameters of drain line L and pipe assembly 20 are substantially the same.

Valve assembly 40 is implemented in the preferred embodiment with ball valve member 42. Valve assembly 40 is disposed at a predetermined distance from end 22. Valve assembly 40 avoids the pass of upstream fluid or air when the flushing system is operated by blocking the connection of tubular pipe assembly 20 with drain line L.

Water hose connector 60 for pressurized water supply is positioned next to valve assembly 40. Connector assembly 60 includes connector or coupler member 62 and cap 64. Cap 64 is removably mounted to connector member 62 when hose H (shown in phantom) is not connected to coupler 62 preventing the entry of extraneous material and also achieving an airtight closure.

Air valve connector assembly 80 for pressurized air includes a standard pressurized air valve member 82 like the one used in bicycle and automobile tires. Typically, a user connects a balloon with pressurized gas (air) to air valve member 82 to flush the downstream drain lines. Air valve connector assembly 80 is connected to pipe assembly 20. Member 82 is preferably positioned between valve assembly 40 and end 22', at a predetermined distance from the latter.

Tubular members 90 and 90' are slightly larger in their internal diameter than the outer diameter of pipe assembly 20 so the former slides over the latter. Slidable tubular members 90 and 90' snugly receive ends 22 and 22' so that tubular members 90 and 90' can be slidably positioned partially over said ends 22 and 22' and the ends of air conditioner drain lines L. Slidable tubular member 90 (and 90') includes ends 92 and 94 (92' and 94' for member 90'). End 92 (and 92') is closer to the center of pipe assembly 20. A sealing adhesive compound 70 is applied to the outer surface adjacent to the ends of drain line L prior to sliding their tubular members 90 and 90' over them. Sealing adhesive compound 70 is also applied to the outer surfaces of pipe assembly 20 adjacent to ends 22 and 22'. The objective is to provide a substantially airtight and watertight that prevents the leakage of the fluid to be used to flush drain line L.

To install in pre-existing installations, a user first cuts a portion of air conditioner drain line L. Subsequently, sealing adhesive compound 70 is applied to the resulting ends of drain line L. Pipe assembly 20 is aligned with the ends of drain line L. Tubular members 90 and 90' are slid over the ends of drain line L. Members 90 and 90' are slid past the final position so that sealing adhesive compound 70 can also be applied to the outer surface of assembly 20 adjacent to ends 22 and 22'. Then, members 90 and 90' are slid back to their final position.

To flush the system with a fluid or liquid, a user first closes valve assembly 40 by rotating ball valve member 42, unscrews cap 64 from coupler 62, connects hose H and allows the pressurized water through. To flush the system with pressurized air, a user also closes valve assembly 40 by rotating ball valve 42, connects a supply of pressurized air with a hose to pressurized air valve 82 and applies the pressurized gas. Cap 64 must be in place before applying pressurized air.

Figure 2:
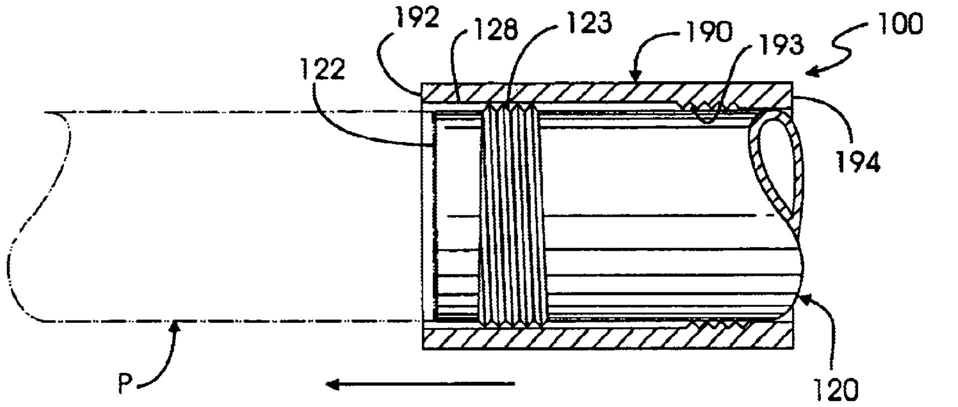
FIG. 2 shows a front elevational view of another embodiment for the slidable tubular members in alignment with and ready to be mounted to a drain line. The tubular members are represented cross-section, the drain line is represented in phantom and a partial representation of the pipe assembly is shown.
Figure 3:
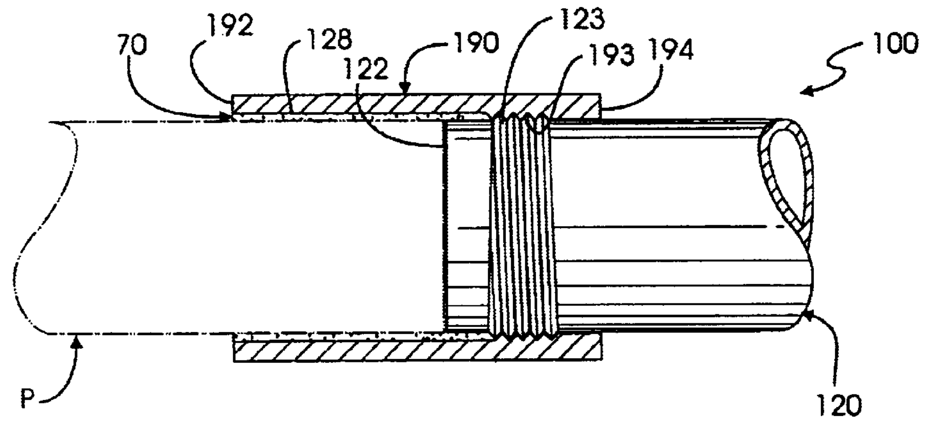
FIG. 3 illustrates a front elevational view of the threaded embodiment represented in FIG. 2, with the slidable tubular member shown at its final position. The tubular member is cross-sectioned and the drain lines are represented in phantom.

Another embodiment for the flushing system 100 is shown in FIGS. 2 and 3. This embodiment includes threaded pipe assembly 120 (partially represented) and threaded slidable tubular member 190. Pipe assembly 120 includes threaded end 122. Slidable tubular member 190 includes internal threads 193 adjacent to end 194, and end 122 has cooperatively mating external threads 123. Internal threads 193 and external threads 123 provide a watertight engagement of end 122 with end 194 without requiring the use of a sealant adhesive compound. End 192 extends outwardly to snuggly receive drain line L to which a sealant adhesive compound is applied.

Figure 4:
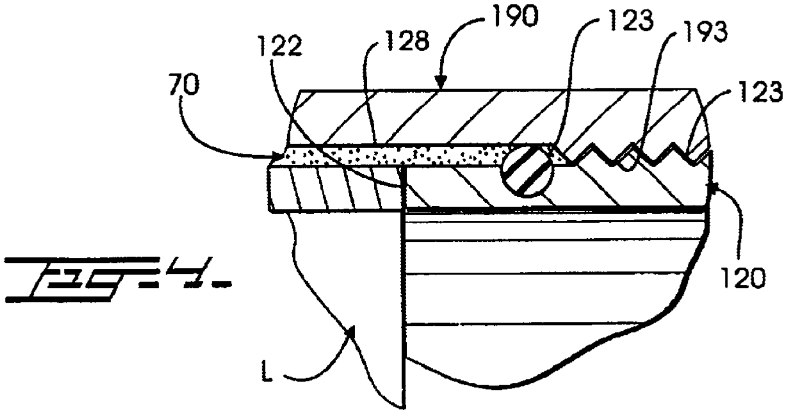
FIG. 4 is a partial detail view of still another embodiment similar to the one represented in FIGS. 2 and 3, with an O-ring.

Another embodiment utilizes O-ring 126 to assure a sealing engagement, as shown in FIG. 4. O-ring 126 seals end 122 against slidable tubular member 190. O-ring 126 is mounted adjacent to end 122 and outer threads 123.

Figure 5:
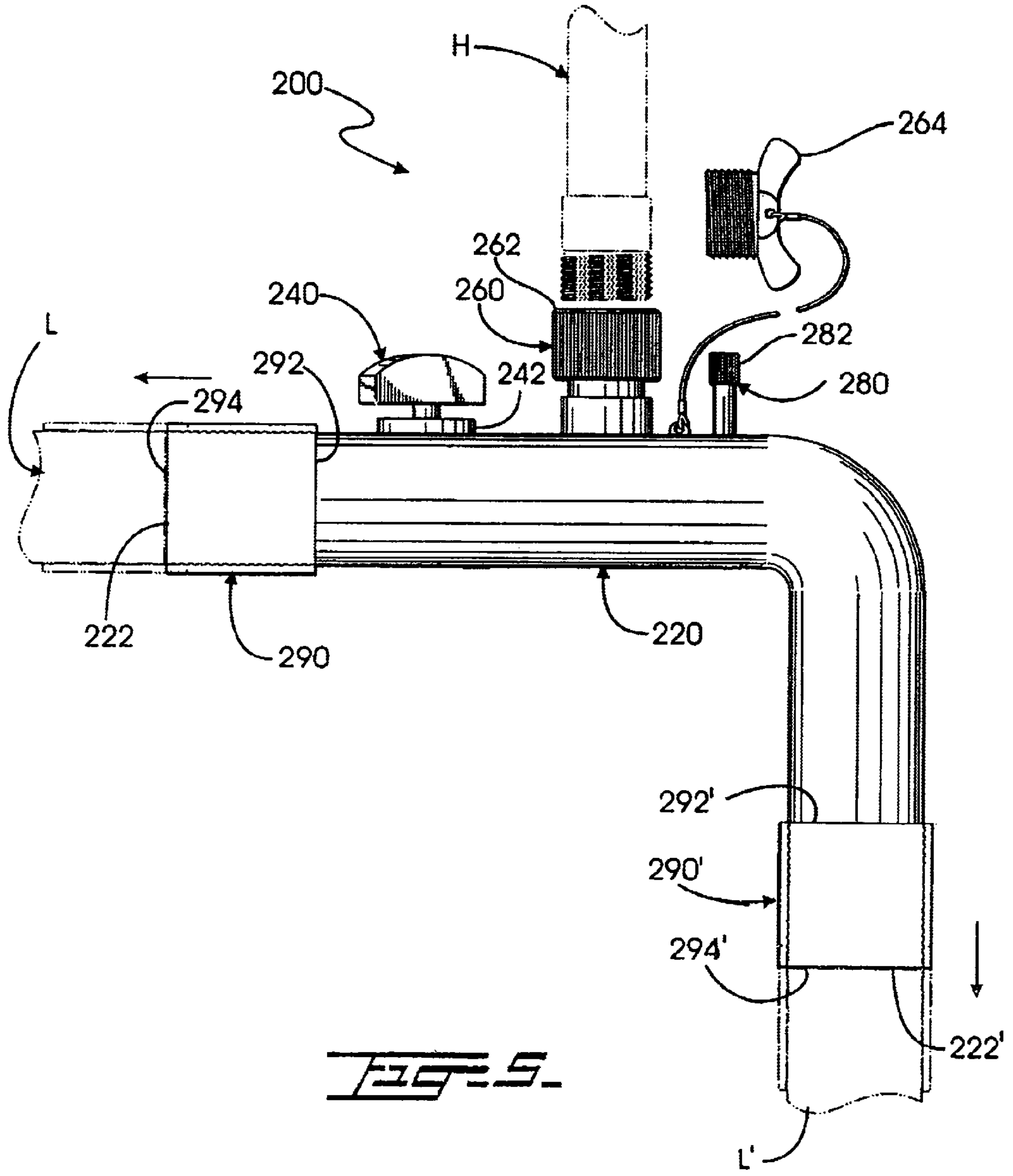
FIG. 5 is a front elevational view of yet another embodiment for the present invention, including an L-shape pipe assembly. The drainpipe of the air conditioning equipment is represented in phantom.

Another embodiment for the flushing system 200 is shown in FIG. 5. This embodiment includes L-shape pipe assembly 220. Flushing system 200 includes pipe assembly 220, valve assembly 240, water hose connector 260, air valve connector 280, slidable tubular members 290 and 290', and air conditioner drain lines L and L' (shown in phantom). Flushing system 200 has the same configuration of flushing system 10 except that pipe assembly 220 has a substantially L-shaped configuration.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for flushing air conditioning drain lines comprising:

A) a tubular pipe assembly with first and second ends; said tubular pipe assembly having a valve means disposed adjacent to said first end, for selectively blocking an up stream passage through said tubular pipe assembly;

B) a first pressure connection means connected to said tubular pipe assembly positioned between said valve means and said second end, for connecting a pressurized liquid to said apparatus;

C) a second pressure connection means connected to said tubular pipe assembly positioned between said valve means and said second end, for connecting a pressurized gas to said apparatus; and D) drain line connection means for connecting said first and second ends between an upper portion and a lower portion of a drain line, respectively; said connection being fluid tight; and wherein said pressurized liquid and gas can be connected simultaneously to said apparatus, and can be simultaneously or selectively applied to said apparatus for flushing said drain line.

2. The apparatus set forth in claim 1 wherein said drain line connection means includes:

first and second slidable tubular members having slightly larger internal diameters than said first and second ends to snugly receive said first and second ends so that said first and second tubular members can be slidably positioned partially over said first and second ends and said upper and lower portions of said drain line.

3. The apparatus set forth in claim 2 wherein said means for connecting said first and second ends includes adhesive means for sealing said tubular members to said first and second ends and to said drain line.

4. The apparatus set forth in claim 2 wherein each of said first and second slidable tubular members includes third and fourth ends, said third ends being closer to the center of said tubular pipe assembly, said first and second slidable tubular members including each an internal thread adjacent to said third ends, and said first and second ends having cooperative external threads each so that said internal and external threads provide a watertight engagement of said first and second ends with said third ends, and said fourth ends extending outwardly to snuggly receive said upper and lower portions of said drain line.

5. The apparatus set forth in claim 4 further including adhesive means for sealing the engagement of said fourth ends of said slidable tubular members to said upper and lower portions of said drain lines.

6. The apparatus set forth in claim 5 further including first and second O-ring means for sealing said first and second ends against said first and second slidable tubular members, said O-ring means being mounted adjacent to said first and second ends and outer threads.

7. The apparatus set forth in claim 6, wherein said liquid is water.

8. The apparatus set forth in claim 6, wherein said gas is air.

9. An apparatus for flushing air conditioning drain lines comprising:

A) a tubular pipe assembly with first and second ends; said tubular pipe assembly having a valve means disposed adjacent to said first end, for selectively blocking an up stream passage through said tubular pipe assembly;

B) a first pressure connection means connected to said tubular pipe assembly positioned between said valve means and said second end, for connecting a pressurized liquid to said apparatus;

C) a second pressure connection means connected to said tubular pipe assembly positioned between said valve means and said second end, for connecting a pressurized gas to said apparatus; and D) drain line connection means for connecting said first and second ends between an upper portion and a lower portion of a drain line, respectively; said connection being fluid tight; wherein said drain line connection means comprising first and second slidable tubular members having slightly larger internal diameters than said first and second ends to snugly receive said first and second ends so that said first and second tubular members can be slidably positioned partially over said first and second ends and said upper and lower portions of said drain line, wherein each of said first and second slidable tubular members includes third and fourth ends, said third ends being closer to the center of said tubular pipe assembly, said first and second slidable tubular members including each an internal thread adjacent to said third ends, and said first and second ends having cooperative external threads each so that said internal and external threads provide a watertight engagement of said first and second ends with said third ends, and said fourth ends extending outwardly to snuggly receive said upper and lower portions of said drain line.

10. The apparatus of claim 9, wherein said upper and lower portions of said drain line received in said fourth ends are unthreaded.

* * * * *